United States Patent
Zhang et al.

(10) Patent No.: US 9,794,121 B2
(45) Date of Patent: Oct. 17, 2017

(54) SYSTEM UPGRADE METHOD AND DEVICE

(71) Applicant: Huawei Technologies Co., Ltd., Shenzhen (CN)

(72) Inventors: Fuwang Zhang, Shenzhen (CN); Hao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/189,905

(22) Filed: Jun. 22, 2016

(65) Prior Publication Data

US 2016/0301567 A1 Oct. 13, 2016

Related U.S. Application Data

(63) Continuation of application No. PCT/CN2013/090199, filed on Dec. 23, 2013.

(51) Int. Cl.
*H04J 14/00* (2006.01)
*H04L 12/24* (2006.01)
(Continued)

(52) U.S. Cl.
CPC ......... *H04L 41/082* (2013.01); *H04B 10/272* (2013.01); *H04B 10/40* (2013.01);
(Continued)

(58) Field of Classification Search
CPC ....... H04Q 11/0067; H04Q 2011/0079; H04Q 11/0062; H04B 10/272; H04L 41/082
(Continued)

(56) References Cited

U.S. PATENT DOCUMENTS

2007/0274341 A1* 11/2007 Rodriguez .............. H04L 41/00 370/473
2008/0120677 A1* 5/2008 Bernard ............. H04Q 11/0067 725/129

(Continued)

FOREIGN PATENT DOCUMENTS

CN 102064955 A 5/2011
CN 102195798 A 9/2011

(Continued)

OTHER PUBLICATIONS

"IEEE Standard for Service Interoperability in Ethernet Passive Optical Networks (SIEPON)," IEEE Std 1904.1-2013, pp. i-802, Institute of Electrical and Electronics Engineers, New York, New York (Jun. 14, 2013).

*Primary Examiner* — Don N Vo
(74) *Attorney, Agent, or Firm* — Leydig, Voit & Mayer, Ltd.

(57) ABSTRACT

Embodiments of the present invention provide a system upgrade method and device, which can reduce a quantity and a time of service interruptions when an ONT and an OLT are upgraded. The method includes: detecting an upgrade triggering event, where the upgrade triggering event is used to instruct an optical network terminal ONT and an optical line terminal OLT to perform a concurrent upgrade; resetting the ONT to activate a preloaded ONT upgrade program; and restoring a service with the OLT. According to the embodiments of the present invention, an ONT and an OLT basically concurrently or synchronously perform upgrading and resetting, that is, a concurrent upgrade, so that a quantity and a time of service interruptions caused when the ONT and the OLT are upgraded are reduced, thereby improving user experience.

18 Claims, 5 Drawing Sheets

(51) Int. Cl.
    *H04B 10/272*    (2013.01)
    *H04B 10/40*     (2013.01)
    *H04B 10/80*     (2013.01)
    *H04Q 11/00*     (2006.01)

(52) U.S. Cl.
    CPC ......... *H04B 10/80* (2013.01); *H04Q 11/0062* (2013.01); *H04Q 2011/0079* (2013.01)

(58) Field of Classification Search
    USPC .......................................................... 398/66
    See application file for complete search history.

(56)                References Cited

U.S. PATENT DOCUMENTS

2009/0226182 A1*   9/2009   Adamiecki .......... H04B 10/272
                                                    398/140
2009/0257749 A1*  10/2009   Rasztovits-Wiech  H04J 14/0226
                                                    398/63
2011/0099545 A1    4/2011   Lee et al.

FOREIGN PATENT DOCUMENTS

CN           103166758   A    6/2013
CN           103384208   A   11/2013
JP           2008135969  A    6/2008
WO       WO 2010072253  A1    7/2010

* cited by examiner

SYSTEM UPGRADE METHOD AND DEVICE

CROSS-REFERENCE TO RELATED APPLICATIONS

This application is a continuation of International Application No. PCT/CN2013/090199, filed on Dec. 23, 2013 which is hereby incorporated by reference in its entirety.

TECHNICAL FIELD

The present invention relates to the communications field, and more specifically, to a system upgrade method and device.

BACKGROUND

When system software is upgraded in an existing passive optical network (Passive Optical Network, PON) system, a manner of independently upgrading an optical line terminal (Optical Line Terminal, OLT) and an optical network terminal (Optical Network Terminal, ONT) is used, and generally, the ONT is first upgraded and then the OLT is upgraded. When the ONT is upgraded, a service interruption may be caused due to reset. When the OLT is upgraded, a service interruption may also be caused due to reset. In this case, at least two service interruptions are successively caused in an entire process of upgrading the PON system, where a time of the service interruptions is a sum of a time of the ONT resetting and a time of the OLT resetting. Therefore, a relatively large quantity of service interruptions and a relatively long time of the interruptions degrade user experience.

SUMMARY

Embodiments of the present invention provide a system upgrade method and device, so that a quantity and a time of service interruptions when an ONT and an OLT are upgraded can be reduced, thereby improving user experience.

According to a first aspect, a system upgrade method is provided, including: detecting an upgrade triggering event, where the upgrade triggering event is used to instruct an optical network terminal ONT and an optical line terminal OLT to perform a concurrent upgrade; resetting the ONT to activate a preloaded ONT upgrade program; and restoring a service with the OLT.

With reference to the first aspect, in a first implementation manner of the first aspect, the upgrade triggering event includes at least one of the following: no downstream optical signal from the OLT is detected within a predetermined time period; a concurrent upgrade message that instructs the ONT to perform resetting and is sent by the OLT before the OLT is upgraded and reset is received; or the preloaded ONT upgrade program is detected.

With reference to the first aspect and the foregoing implementation manner of the first aspect, in a second implementation manner of the first aspect, before the detecting an upgrade triggering event, the method further includes: receiving an indication message that is used to indicate the upgrade triggering event to the ONT and sent by the OLT.

With reference to the first aspect and the foregoing implementation manners of the first aspect, in a third implementation manner of the first aspect, the indication message includes at least one of the following: an OAM, an OMCI, and a PLOAM.

With reference to the first aspect and the foregoing implementation manners of the first aspect, in a fourth implementation manner of the first aspect, before the resetting the ONT to activate a preloaded ONT upgrade program, the method further includes: receiving and loading the ONT upgrade program sent by the OLT.

With reference to the first aspect and the foregoing implementation manners of the first aspect, in a fifth implementation manner of the first aspect, the ONT upgrade program includes: a command line that is used to indicate the upgrade triggering event to the ONT.

With reference to the first aspect and the foregoing implementation manners of the first aspect, in a sixth implementation manner of the first aspect, the concurrent upgrade message includes at least one of the following: an OMCI and a broadcast PLOAM.

With reference to the first aspect and the foregoing implementation manners of the first aspect, in a seventh implementation manner of the first aspect, the predetermined time period is greater than 100 ms.

According to a second aspect, a system upgrade method is provided, including: sending an indication message to an optical network terminal ONT, where the indication message is used to instruct the ONT and an optical line terminal OLT to perform a concurrent upgrade; resetting the OLT to activate a preloaded OLT upgrade program; and restoring a service with the ONT.

With reference to the second aspect, in a first implementation manner of the second aspect, the indication message is used to indicate attribute information that the ONT performs ONT resetting when the ONT detects no downstream optical signal from the OLT within a predetermined time period, or to instruct the ONT to perform resetting.

With reference to the second aspect and the foregoing implementation manner of the second aspect, in a second implementation manner of the second aspect, before the resetting the OLT to activate a preloaded OLT upgrade program, the method further includes: sending an ONT upgrade program to the ONT, so that the ONT loads the ONT upgrade program.

With reference to the second aspect and the foregoing implementation manners of the second aspect, in a third implementation manner of the second aspect, the ONT upgrade program includes: a command line that is used to indicate that the ONT performs ONT resetting when the ONT detects no downstream optical signal from the OLT within a predetermined time period.

With reference to the second aspect and the foregoing implementation manners of the second aspect, in a fourth implementation manner of the second aspect, the indication message includes at least one of the following: an OAM, an OMCI, and a PLOAM.

With reference to the second aspect and the foregoing implementation manners of the second aspect, in a fifth implementation manner of the second aspect, the predetermined time period is greater than 100 ms.

According to a third aspect, an optical network terminal is provided, including: a detection unit, configured to detect an upgrade triggering event, where the upgrade triggering event is used to instruct the optical network terminal ONT and an optical line terminal OLT to perform a concurrent upgrade; a resetting unit, configured to reset the ONT to activate a preloaded ONT upgrade program; and a service restoration unit, configured to restore a service with the OLT.

With reference to the third aspect, in a first implementation manner of the third aspect, the upgrade triggering event detected by the detection unit includes at least one of the following: no downstream optical signal from the OLT is detected within a predetermined time period; a concurrent upgrade message that instructs the ONT to perform resetting and is sent by the OLT before the OLT is upgraded and reset is received; or the preloaded ONT upgrade program is detected.

With reference to the third aspect and the foregoing implementation manner of the third aspect, in a second implementation manner of the third aspect, the ONT further includes a receiving unit, where the receiving unit is configured to receive an indication message that is used to indicate the upgrade triggering event to the ONT and sent by the OLT.

With reference to the third aspect and the foregoing implementation manners of the third aspect, in a third implementation manner of the third aspect, the indication message includes at least one of the following: an OAM, an OMCI, and a PLOAM.

With reference to the third aspect and the foregoing implementation manners of the third aspect, in a fourth implementation manner of the third aspect, the ONT further includes a receiving unit, where the receiving unit is configured to receive and load the ONT upgrade program sent by the OLT.

With reference to the third aspect and the foregoing implementation manners of the third aspect, in a fifth implementation manner of the third aspect, the ONT upgrade program includes: a command line that is used to indicate the upgrade triggering event to the ONT.

With reference to the third aspect and the foregoing implementation manners of the third aspect, in a sixth implementation manner of the third aspect, the concurrent upgrade message includes at least one of the following: an OMCI and a broadcast PLOAM.

With reference to the third aspect and the foregoing implementation manners of the third aspect, in a seventh implementation manner of the third aspect, the predetermined time period is greater than 100 ms.

According to a fourth aspect, an optical line terminal is provided, including: a sending unit, configured to send an indication message to an optical network terminal ONT, where the indication message is used to instruct the ONT and the optical line terminal OLT to perform a concurrent upgrade; a resetting unit, configured to reset the OLT to activate a preloaded OLT upgrade program; and a service restoration unit, configured to restore a service with the ONT.

With reference to the fourth aspect, in a first implementation manner of the fourth aspect, the indication message sent by the sending unit is used to indicate attribute information that the ONT performs ONT resetting when the ONT detects no downstream optical signal from the OLT within a predetermined time period, or to instruct the ONT to perform resetting.

With reference to the fourth aspect and the foregoing implementation manner of the fourth aspect, in a second implementation manner of the fourth aspect, the sending unit is further configured to send an ONT upgrade program to the ONT, so that the ONT loads the ONT upgrade program.

With reference to the fourth aspect and the foregoing implementation manners of the fourth aspect, in a third implementation manner of the fourth aspect, the ONT upgrade program includes: a command line that is used to indicate that the ONT performs ONT resetting when the ONT detects no downstream optical signal from the OLT within a predetermined time period.

With reference to the fourth aspect and the foregoing implementation manners of the fourth aspect, in a fourth implementation manner of the fourth aspect, the indication message includes at least one of the following: an OAM, an OMCI, and a PLOAM.

With reference to the fourth aspect and the foregoing implementation manners of the fourth aspect, in a fifth implementation manner of the fourth aspect, the predetermined time period is greater than 100 ms.

According to the embodiments of the present invention, an ONT and an OLT perform a concurrent upgrade, so that a quantity and a time of service interruptions caused when the ONT and the OLT are upgraded are reduced, thereby improving user experience.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
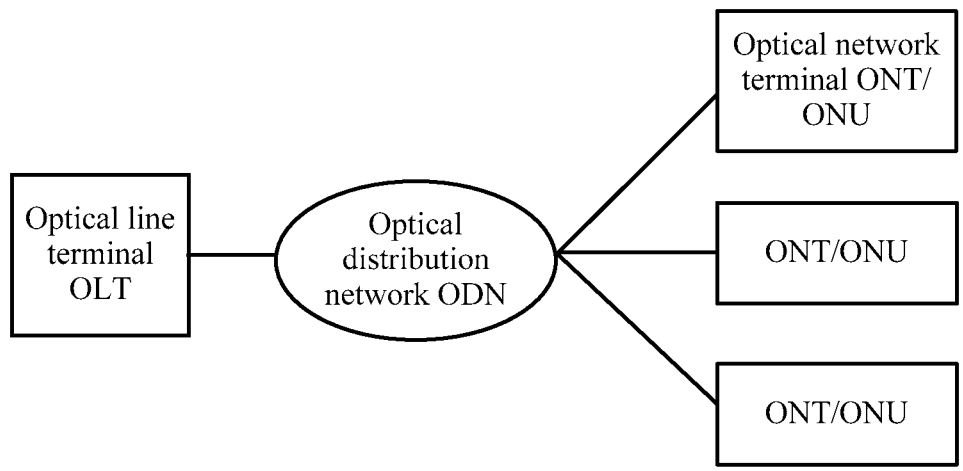
FIG. 1 is a block diagram of a passive optical network PON system according to the present invention.

FIG. 1 is a block diagram of a passive optical network PON system according to the present invention.

The passive optical network (Passive Optical Network, PON) system generally comprises: an optical line terminal (Optical Line Terminal, OLT) at a central office, an optical distribution network (Optical Distribution Network, ODN), and an optical network terminal (Optical Network Terminal, ONT)/optical network unit (Optical Network Unit, ONU) at a customer-premises equipment. For ease of description, terminal devices or units that are located at a user's premises and connected to the ODN are collectively referred to as optical network terminals ONTs. In the PON system shown in FIG. 1, the OLT manages the ONT by using a management packet, such as an operation, administration and maintenance (Operation Administration and Maintenance, OAM)/an ONT management and control interface (ONT Management and Control Interface, OMCI). The ODN is an optical cable network that connects the OLT and the ONT, and is used to provide an optical transmission path for communication between the OLT and the ONU. The ODN is a passive device and does not need software control.

It should be understood that an application scenario of this embodiment of the present invention may be not limited to the PON system. For a network system including multiple network elements, or for multiple parts in a network element or a device, a system upgrade may be performed by using the method in this embodiment of the present invention.

Figure 2:
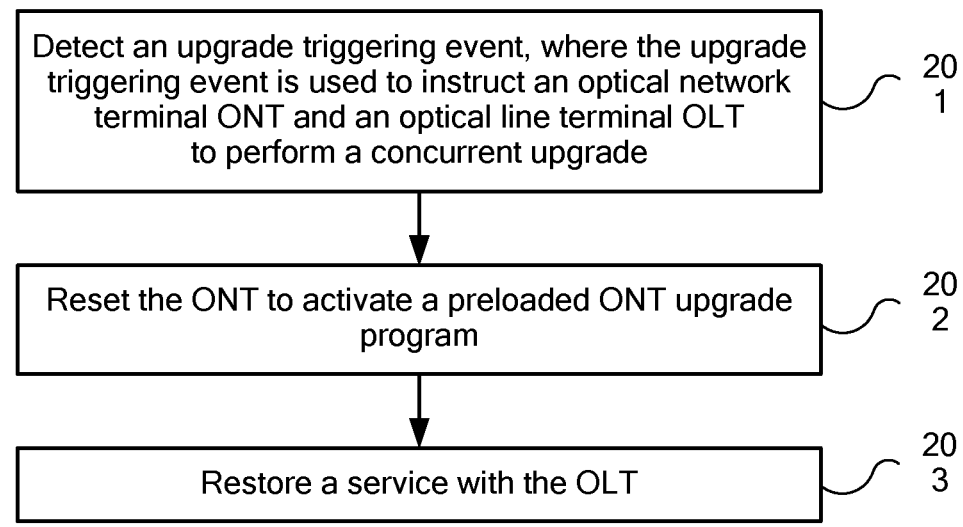
FIG. 2 is a flowchart of a system upgrade method according to an embodiment of the present invention.

FIG. 2 is a flowchart of a system upgrade method according to an embodiment of the present invention. The method shown in FIG. 2 is executed by an ONT.

201. Detect an upgrade triggering event, where the upgrade triggering event is used to instruct the optical network terminal ONT and an optical line terminal OLT to perform a concurrent upgrade.

202. Reset the ONT to activate a preloaded ONT upgrade program.

203. Restore a service with the OLT.

According to this embodiment of the present invention, an ONT and an OLT perform a concurrent upgrade, so that a quantity and a time of service interruptions caused when the ONT and the OLT are upgraded are reduced, thereby improving user experience.

The concurrent upgrade means that when a device or functional entity is upgraded, another associated device or functional entity is also upgraded accordingly. For example, that the ONT and the OLT perform the concurrent upgrade means that when the OLT is upgraded, the ONT is upgraded concurrently or synchronously with the OLT. A case in which the ONT and the OLT are upgraded and reset concurrently or synchronously is relative to a case in which the ONT and the OLT are upgraded and reset separately and independently. In other words, when there is an intersection between time periods in which the ONT and the OLT are upgraded and reset, it may be considered that the ONT and the OLT are upgraded and reset concurrently or synchronously.

When the ONT detects an upgrade triggering event that meets a condition, the ONT triggers upgrading and resetting of the ONT. When the ONT detects the upgrade triggering event, it indicates that the OLT is also to start or starts to perform upgrading and resetting of the OLT. In this case, upgrading and resetting of the ONT and upgrading and resetting of the OLT constitute the concurrent upgrade. After completing upgrading, the OLT may restore the service with the ONT that also completes upgrading, so that a user can perform normal communication.

Optionally, in an embodiment, the upgrade triggering event includes at least one of the following: no downstream optical signal from the OLT is detected within a predetermined time period; a concurrent upgrade message that instructs the ONT to perform resetting and is sent by the OLT before the OLT is upgraded and reset is received; or the preloaded ONT upgrade program is detected.

That is, when the ONT detects any one or more of the foregoing cases, the ONT may trigger upgrading and resetting. Specifically, the OLT at normal work continuously sends a downstream optical signal, that is, light is continuously emitted in a downstream, and when the OLT performs upgrading and resetting, an interruption of downstream light emission may be caused due to device restart. In this case, the ONT may detect a loss of the downstream optical signal (Loss of Signal, LOS), and upgrading and resetting subsequently performed by the ONT are basically concurrent or synchronous with upgrading and resetting of the OLT.

Preferably, a downstream LOS time period may be preset, that is, the ONT triggers upgrading and resetting of the ONT only when the ONT detects that a downstream LOS time exceeds the time period. In this way, mis-determining of the ONT caused by a short-time transient interruption of the downstream optical signal from the OLT may be avoided.

Optionally, the upgrade triggering event may be: the ONT detects the concurrent upgrade message delivered by the OLT, where the concurrent upgrade message is used to instruct the ONT to immediately perform upgrading and resetting. The concurrent upgrade message may be sent to the ONT when the OLT is to perform upgrading and resetting of the OLT or starts to perform upgrading and resetting, so as to ensure that the ONT and the OLT basically concurrently or synchronously start to perform upgrading and resetting.

In addition, that the preloaded ONT upgrade program is detected may be used as an additional triggering condition. That the preloaded ONT upgrade program is detected, and that the downstream LOS is detected or that the concurrent upgrade message is received are combined as a condition for determining whether the ONT triggers upgrading and resetting. In this way, accuracy of triggering upgrading and resetting of the ONT can be further ensured, so as to avoid an upgrade failure.

Optionally, in an embodiment, before the detecting an upgrade triggering event, the method further includes: receiving an indication message that is used to indicate the upgrade triggering event to the ONT and sent by the OLT. That is, the OLT and the ONT may agree on the upgrade triggering event in advance, so that when the ONT detects the upgrade triggering event that is agreed on in advance, the ONT performs upgrading and resetting.

Optionally, the indication message includes at least one of the following: an OAM, an OMCI, and a PLOAM. Specifically, an attribute or information that is used to indicate the upgrade triggering event may be added into a specific message that is used to manage the ONT, so as to form the foregoing indication message.

Optionally, in an embodiment, before the resetting the ONT to activate a preloaded ONT upgrade program, the method further includes: receiving and loading the ONT upgrade program sent by the OLT.

Generally, the ONT upgrade program is delivered by the OLT and loaded to a corresponding ONT device for use in subsequent upgrading of the ONT device. In addition, alternatively, network maintenance personnel may manually load the ONT upgrade program to the ONT, or the ONT device locally prestores the ONT upgrade program.

Optionally, in an embodiment, the ONT upgrade program includes: a command line that is used to indicate the upgrade triggering event to the ONT. That is, a new program used for upgrading is carried in the ONT upgrade program, and a concurrent upgrade command may further be added, so that when the ONT detects the upgrade triggering event, the ONT performs upgrading and resetting.

Optionally, the concurrent upgrade message includes at least one of the following: an OMCI and a broadcast PLOAM.

Optionally, in an embodiment, the predetermined time period is greater than 100 ms. In this way, mis-determining caused by a transient interruption of downstream light may be avoided. The predetermined time period may be determined by the network maintenance personnel according to experience or an experimental result to make the predetermined time period greater than a general time of the transient interruption of downstream light.

Optionally, in an embodiment, after upgrading and resetting end, the ONT detects the downstream optical signal from the OLT; and if the downstream optical signal is detected, notifies the OLT that upgrading of the ONT succeeds. The OLT responds to the ONT, and then normal service communication is performed, so that the service is restored.

According to this embodiment of the present invention, an ONT and an OLT basically concurrently or synchronously perform upgrading and resetting, that is, a concurrent upgrade, so that a quantity and a time of service interruptions caused when the ONT and the OLT are upgraded are reduced, thereby improving user experience. In addition, detecting a loss of a downstream optical signal within a predetermined time period may further be agreed on and preset in an upgrade triggering event, so as to avoid mis-determining caused by a transient interruption of downstream light and avoid an upgrade failure caused by the mis-determining.

Figure 3:
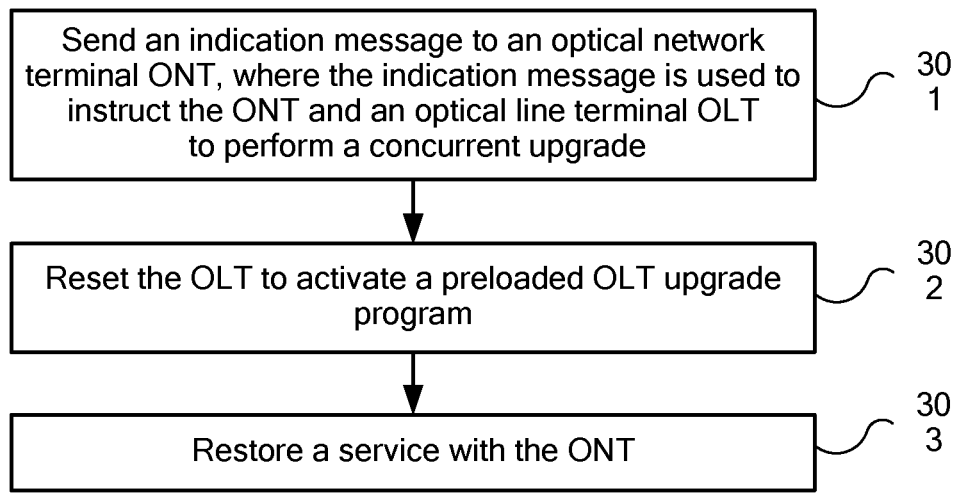
FIG. 3 is a flowchart of a system upgrade method according to an embodiment of the present invention.

FIG. 3 is a flowchart of a system upgrade method according to an embodiment of the present invention. The method shown in FIG. 3 is executed by an OLT.

301. Send an indication message to an optical network terminal ONT, where the indication message is used to instruct the ONT and the optical line terminal OLT to perform a concurrent upgrade.

302. Reset the OLT to activate a preloaded OLT upgrade program.

303. Restore a service with the ONT.

According to this embodiment of the present invention, an ONT and an OLT perform a concurrent upgrade, so that a quantity and a time of service interruptions caused when the ONT and the OLT are upgraded are reduced, thereby improving user experience.

The concurrent upgrade means that when a device or functional entity is upgraded, another associated device or functional entity is also upgraded accordingly. For example, that the ONT and the OLT perform the concurrent upgrade means that when the OLT is upgraded, the ONT is upgraded concurrently or synchronously with the OLT. A case in which the ONT and the OLT are upgraded and reset concurrently or synchronously is relative to a case in which the ONT and the OLT are upgraded and reset separately and independently. In other words, when there is an intersection between time periods in which the ONT and the OLT are upgraded and reset, it may be considered that the ONT and the OLT are upgraded and reset concurrently or synchronously.

The OLT sends the indication information to the ONT and instructs the ONT to perform upgrading and resetting when a particular condition is met or to immediately perform upgrading and resetting. When the ONT meets the particular condition, it indicates that the OLT is to start or starts to perform upgrading and resetting. If the OLT instructs the ONT to immediately perform upgrading and resetting, it also indicates that the OLT is to start or starts to perform upgrading and resetting. Therefore, upgrading and resetting of the ONT and upgrading and resetting of the OLT constitute the concurrent upgrade. After completing upgrading, the OLT may restore the service with the ONT that also completes upgrading, so that a user can perform normal communication.

Optionally, in an embodiment, the indication message is used to indicate attribute information that the ONT performs ONT resetting when the ONT detects no downstream optical signal from the OLT within a predetermined time period, or to instruct the ONT to perform resetting.

That is, when the ONT detects any one or more of the foregoing cases, the ONT may trigger upgrading and resetting. Specifically, the OLT at normal work continuously sends a downstream optical signal, that is, light is continuously emitted in a downstream, and when the OLT performs upgrading and resetting, an interruption of downstream light emission may be caused due to device restart. In this case, the ONT may detect a loss of the downstream optical signal (Loss of Signal, LOS), and upgrading and resetting subsequently performed by the ONT are basically concurrent or synchronous with upgrading and resetting of the OLT.

Preferably, a downstream LOS time period may be preset, that is, the ONT triggers upgrading and resetting of the ONT only when the ONT detects that a downstream LOS time exceeds the time period. In this way, mis-determining of the ONT caused by a short-time transient interruption of the downstream optical signal from the OLT may be avoided.

Optionally, an upgrade triggering event may be: the ONT detects a concurrent upgrade message delivered by the OLT, where the concurrent upgrade message is used to instruct the ONT to immediately perform upgrading and resetting. The concurrent upgrade message may be sent to the ONT when the OLT is to perform upgrading and resetting of the OLT or starts to perform upgrading and resetting, so as to ensure that the ONT and the OLT basically concurrently or synchronously start to perform upgrading and resetting.

In addition, that a preloaded ONT upgrade program is detected may be used as an additional triggering condition. That the preloaded ONT upgrade program is detected, and that the downstream LOS is detected or that the concurrent upgrade message is received are combined as a condition for determining whether the ONT triggers upgrading and resetting. In this way, accuracy of triggering upgrading and resetting of the ONT can be further ensured, so as to avoid an upgrade failure.

Optionally, in an embodiment, before the resetting the OLT to activate a preloaded OLT upgrade program, the method further includes: sending the ONT upgrade program to the ONT, so that the ONT loads the ONT upgrade program. Generally, the ONT upgrade program is delivered by the OLT and loaded to a corresponding ONT device for use in subsequent upgrading of the ONT device. In addition, alternatively, network maintenance personnel may manually load the ONT upgrade program to the ONT, or the ONT device locally prestores the ONT upgrade program.

Optionally, in an embodiment, the ONT upgrade program includes: a command line that is used to indicate that the ONT performs ONT resetting when the ONT detects no downstream optical signal from the OLT within the predetermined time period. That is, a new program used for upgrading is carried in the ONT upgrade program, and a concurrent upgrade command may further be added, so that when the ONT detects the loss of the downstream optical signal, the ONT performs upgrading and resetting.

Optionally, in an embodiment, the indication message includes at least one of the following: an OAM, an OMCI, and a PLOAM. Specifically, an attribute or information that is used to instruct or trigger the ONT to perform upgrading and resetting may be added into a specific message that is used to manage the ONT, so as to form the foregoing indication message.

Optionally, in an embodiment, the predetermined time period is greater than 100 ms. In this way, mis-determining caused by a transient interruption of downstream light may be avoided. The predetermined time period may be determined by the network maintenance personnel according to experience or an experimental result to make the predetermined time period greater than a general time of the transient interruption of downstream light.

Optionally, in an embodiment, after upgrading and resetting end, the ONT detects the downstream optical signal from the OLT; and if the downstream optical signal is detected, notifies the OLT that upgrading of the ONT succeeds. The OLT responds to the ONT, and then normal service communication is performed, so that the service is restored.

According to this embodiment of the present invention, an ONT and an OLT basically concurrently or synchronously perform upgrading and resetting, that is, a concurrent upgrade, so that a quantity and a time of service interruptions caused when the ONT and the OLT are upgraded are reduced, thereby improving user experience. In addition, detecting a loss of a downstream optical signal within a predetermined time period may further be agreed on and preset in an upgrade triggering event, so as to avoid mis-determining caused by a transient interruption of downstream light and avoid an upgrade failure caused by the mis-determining.

Figure 4:
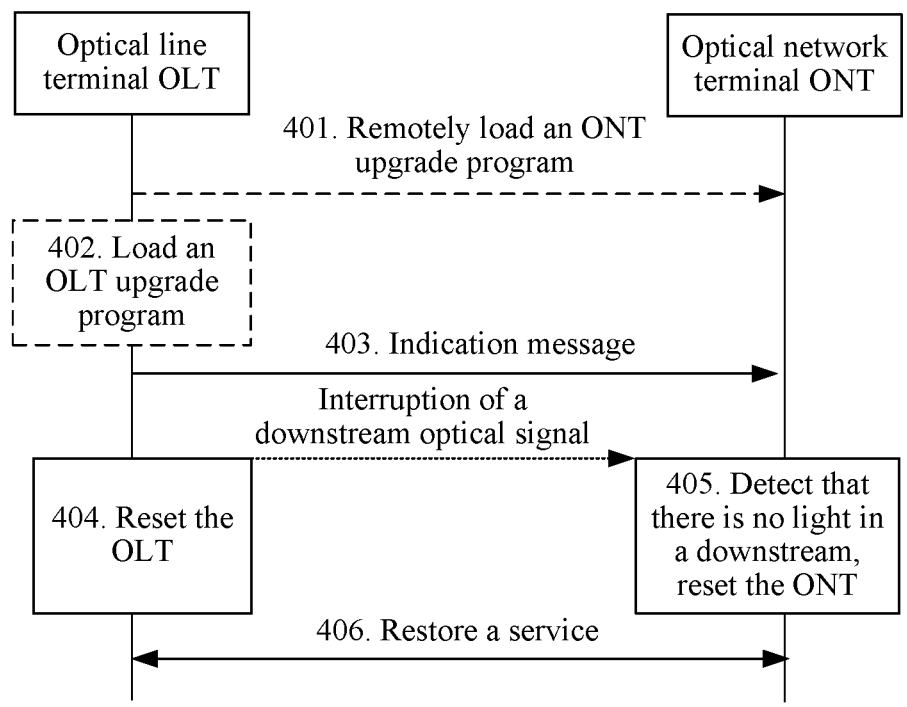
FIG. 4 is an interaction diagram of a system upgrade method according to an embodiment of the present invention.

FIG. 4 is an interaction diagram of a system upgrade method according to an embodiment of the present invention.

401. Remotely load an ONT upgrade program.

Before a system upgrade is performed, an upgrade program needs to be preloaded to each to-be-upgraded device. Because upgrading of a PON system is generally controlled and dominated by a central office, and an upgrade program of an ONT at a user's premises is generally delivered by an OLT and loaded to a corresponding ONT device for use in subsequent upgrading of the ONT device.

It should be understood that step 401 is an optional step. Specifically, in addition to that the ONT upgrade program is remotely loaded, in some special cases, the ONT upgrade program may be directly loaded to the ONT. In this process, network maintenance personnel may manually load the ONT upgrade program at the user's premises, or the ONT device locally prestores the ONT upgrade program, which is not limited in the present invention.

It should further be understood that step 401 is not necessarily performed before step 402. Step 401 may be performed at any moment before the following step 405: After the ONT detects that there is no downstream light, the ONT performs upgrading and resetting, which is not limited in the present invention.

402. Load an OLT upgrade program.

Before step 404: Reset the OLT, an upgrade program also needs to be loaded to the OLT, which is similar to step 401, where the OLT upgrade program may be loaded under the control of the central office or manually loaded by the network maintenance personnel, which is not limited in the present invention. In addition, step 402 may be performed at any moment before step 404.

403. Implementing an indication message.

Before being upgraded and reset, the OLT sends, to the ONT, the indication message that is used to indicate an upgrade triggering event. Specifically, the OLT may use some specific messages, which manage the ONT, to carry attribute information that can indicate the upgrade triggering event, so as to instruct the ONT to perform upgrading and resetting of the ONT when the ONT detects that the upgrade triggering event is met. Generally, the upgrade triggering event may indicate that the OLT starts or is to start to perform upgrading and resetting. In this way, upgrading and resetting of the ONT implemented by the ONT may be basically synchronously with upgrading and resetting of the OLT.

Specifically, the indication message may be one of the specific messages, such as an OAM, an OMCI, and a PLOAM, that carry the attribute information that can indicate the upgrade triggering event. An OMCI-type message is used as an example, and attribute information that identifies the upgrade triggering event may be added by extending an ONT2-G entity. In a specific example, a concurrent upgrade CoUpdate attribute may be added into the ONT2-G entity, and a default value of the attribute is agreed as 0, where when a value of the attribute is set to 1, it indicates that if the ONT detects a loss of a downstream optical signal (there is no light in a downstream) from the OLT, the ONT starts to perform upgrading and resetting to activate a preloaded ONT upgrade program. Generally, the OLT and the ONT may further agree on the upgrade triggering event by adding, into an entity of another specific message, the attribute information that identifies the upgrade triggering event, which is not limited in the present invention.

In addition, in a preferable embodiment, the attribute may further be set to that the ONT triggers upgrading and resetting of the ONT only if the ONT detects that a time during which there is no light in the downstream exceeds a predetermined time period. Herein, the predetermined time period may be preset to 100 ms, so as to avoid mis-determining caused by a transient interruption of downstream light. The predetermined time period may be determined by the network maintenance personnel according to experience or an experimental result to make the predetermined time period greater than a general time of the transient interruption of downstream light.

In addition, the attribute may further be set to that when detecting that there is no light in the downstream, the ONT further needs to determine that the ONT locally has the preloaded ONT upgrade program. The ONT triggers upgrading and resetting of the ONT only when both the foregoing conditions are met, so that accuracy of triggering upgrading can be ensured, so as to avoid an upgrade failure caused by mis-determining of triggering upgrading.

404. Reset the OLT.

After receiving an upgrade command, the OLT performs upgrading and resetting of the OLT to activate a preloaded OLT upgrade program, so that the OLT upgrade program becomes effective. Specifically, the upgrade command may be sent by an upper-layer control network element of the OLT or may be manually sent by the network maintenance personnel. Alternatively, the OLT may automatically initiate upgrading and resetting, where a condition of automatically initiating upgrading and resetting by the OLT may be agreed as that the OLT completes loading the upgrade program and sends, to the ONT, the indication message that is used to indicate the upgrade triggering event.

Upgrading and resetting of the OLT are restarting a hardware device to drive resetting of a software system. When the device is restarted, downstream OLT light emission is closed, and therefore a service is interrupted.

405. The ONT detects that there is no light in the downstream.

The ONT detects the upgrade triggering event that is indicated by the indication message in step 403. When an interruption of the downstream optical signal from the OLT is detected, that is, there is no downstream light, the ONT triggers upgrading and resetting of the ONT. If the upgrade triggering event further includes another condition, for example, the predetermined time period is 100 ms, and it is determined that the ONT locally has the preloaded ONT upgrade program, the ONT needs to determine that the foregoing conditions are met, and then can trigger upgrading and resetting of the ONT to activate the preloaded ONT upgrade program, so that the upgrade program becomes effective.

406. Restore the service.

After upgrading and resetting end, the ONT may continue detecting the downstream optical signal from the OLT, so as to determine whether the OLT completes upgrading; and if no downstream optical signal is detected, may keep detecting; or if a downstream optical signal is detected, notifies the OLT that upgrading of the ONT succeeds. The OLT responds to the ONT, and then normal service communication is performed, so that the service between the OLT and the ONT is restored.

It should be understood that it is assumed that a moment of starting upgrading and resetting of the OLT is t1, a moment of ending upgrading and resetting of the OLT is t2, a moment of starting upgrading and resetting of the ONT is t3, and a moment of ending upgrading and resetting of the ONT is t4. It may be considered that t1 and t3 are basically a same moment or t3 is later than t1, where an amount of lateness is the predetermined time period in the foregoing step 403, for example, 100 ms. A moment of ending upgrading and resetting depends on times that are consumed during upgrading and resetting of the OLT and the ONT. A time difference T between t1 and a later moment of t2 and t4 is a time of a service interruption in this embodiment of the present invention. It is easy to understand that T is less than a sum of the times that are consumed during upgrading and resetting of the OLT and the ONT.

According to this embodiment of the present invention, an OLT and an ONT agree on an upgrade triggering event, so that the ONT and the OLT can basically concurrently or synchronously perform upgrading and resetting, that is, a concurrent upgrade, and a quantity and a time of service interruptions caused when the ONT and the OLT are upgraded are reduced, thereby improving user experience. In addition, detecting a loss of a downstream optical signal within a predetermined time period may further be agreed on and preset in the upgrade triggering event, so as to avoid mis-determining caused by a transient interruption of downstream light and avoid an upgrade failure caused by the mis-determining.

Figure 5:
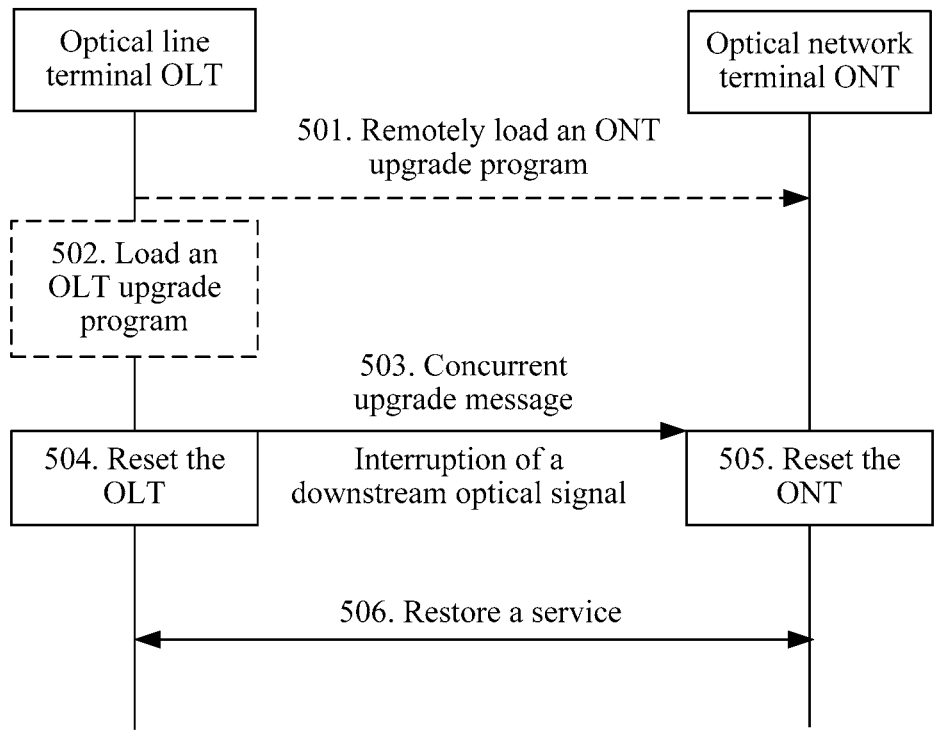
FIG. 5 is an interaction diagram of a system upgrade method according to another embodiment of the present invention.

FIG. 5 is an interaction diagram of a system upgrade method according to another embodiment of the present invention.

501. Remotely load an ONT upgrade program.

Before a system upgrade is performed, an upgrade program needs to be preloaded to each to-be-upgraded device. Because upgrading of a PON system is generally controlled and dominated by a central office, an upgrade program of an ONT at a user's premises is generally delivered by an OLT and loaded to a corresponding ONT device for use in subsequent upgrading of the ONT device.

It should be understood that step 501 is an optional step. Specifically, in addition to that the ONT upgrade program is remotely loaded, in some special cases, the ONT upgrade program may be directly loaded to the ONT. In this process, network maintenance personnel may manually load the ONT upgrade program at the user's premises, or the ONT device locally prestores the ONT upgrade program, which is not limited in the present invention.

It should further be understood that step 501 is not necessarily performed before step 502. Step 501 may be performed at any moment before the following step 505: The ONT receives a concurrent upgrade message and performs upgrading and resetting, which is not limited in the present invention.

502. Load an OLT upgrade program.

Before step 504: Reset the OLT, an upgrade program also needs to be loaded to the OLT, which is similar to step 501, where the OLT upgrade program may be loaded under the control of the central office or manually loaded by the network maintenance personnel, which is not limited in the present invention. In addition, step 502 may be performed at any moment before step 504.

503. Sending a concurrent upgrade message.

Before being upgraded and reset, the OLT sends, to the ONT, the concurrent upgrade message that is used to instruct the ONT to perform resetting. Specifically, the OLT may use some specific messages, which manage the ONT, to carry attribute information that can instruct the ONT to perform resetting, so as to instruct the ONT to immediately perform upgrading and resetting when receiving the concurrent upgrade message. Because the concurrent upgrade message is sent to the ONT by the OLT when the OLT is to perform upgrading and resetting or starts to perform upgrading and resetting, upgrading and resetting of the ONT implemented by the ONT may be basically synchronously with upgrading and resetting of the OLT.

Specifically, an indication message may be one of the specific messages, such as an OAM, an OMCI, and a PLOAM, that carry the attribute information that can instruct the ONT to perform resetting. A broadcast PLOAM message is used as an example. The attribute information that is used to instruct the ONT to perform resetting may be set in the broadcast PLOAM, where the attribute information may include an information name, an information type, and information content that are each described by using at least one byte. The information name may include an identifier ID of an ONT and indicates that the attribute information is exclusive to the ONT, or the information name may include a special byte, for example, 11111111, to identify that the attribute information is a broadcast for all ONTs. The information type is used to identify that the attribute information is concurrent upgrade attribute information and instruct the ONT to perform resetting after the ONT receives the attribute information. The information content may include additional information. Generally, the attribute information that can instruct the ONT to perform resetting may be added into an entity of another specific message, which is not limited in the present invention.

In addition, the attribute may further be set to that the ONT further needs to determine that the ONT locally has a preloaded ONT upgrade program, and then triggers upgrading and resetting of the ONT, so that accuracy of triggering upgrading can be ensured, so as to avoid an upgrade failure caused by mis-determining of triggering upgrading.

504. Reset the OLT.

After receiving an upgrade command, the OLT performs upgrading and resetting of the OLT to activate a preloaded OLT upgrade program, so that the OLT upgrade program becomes effective. Specifically, the upgrade command may be sent by an upper-layer control network element of the OLT or may be manually sent by the network maintenance personnel. Alternatively, the OLT may automatically initiate upgrading and resetting, where a condition of automatically initiating upgrading and resetting by the OLT may be agreed as that the OLT completes loading the upgrade program and sends, to the ONT, the indication message that is used to indicate an upgrade triggering event.

Upgrading and resetting of the OLT are restarting a hardware device to drive resetting of a software system. When the device is restarted, downstream OLT light emission is closed, and therefore a service is interrupted.

505. The ONT receives the concurrent upgrade message and performs upgrading and resetting.

After receiving the concurrent upgrade message that is used to instruct the ONT to perform resetting in step 503, the ONT performs upgrading and resetting to activate the preloaded ONT upgrade program. In addition, alternatively, the ONT may trigger upgrading and resetting of the ONT according to an agreement after determining that the ONT locally has the preloaded ONT upgrade program, to activate the preloaded ONT upgrade program, so that the upgrade program becomes effective. In this way, accuracy of triggering upgrading can be ensured, so as to avoid an upgrade failure caused by mis-determining of triggering upgrading.

506. Restore the service.

After upgrading and resetting end, the ONT may continue detecting the downstream optical signal from the OLT, so as to determine whether the OLT completes upgrading; and if no downstream optical signal is detected, may keep detecting; or if a downstream optical signal is detected, notifies the OLT that upgrading of the ONT succeeds. The OLT responds to the ONT, and then normal service communication is performed, so that the service between the OLT and the ONT is restored.

It should be understood that it is assumed that a moment of starting upgrading and resetting of the OLT is t1, a moment of ending upgrading and resetting of the OLT is t2, a moment of starting upgrading and resetting of the ONT is t3, and a moment of ending upgrading and resetting of the ONT is t4. It may be considered that t1 and t3 are basically a same moment or t3 is later than t1, where an amount of lateness is the predetermined time period in the foregoing step 403. A moment of ending upgrading and resetting depends on times that are consumed during upgrading and resetting of the OLT and the ONT. A time difference T between t1 and a later moment of t2 and t4 is a time of a service interruption in this embodiment of the present invention. It is easy to understand that T is less than a sum of the times that are consumed during upgrading and resetting of the OLT and the ONT.

According to this embodiment of the present invention, when an OLT is to start or starts to perform upgrading and resetting, the OLT notifies an ONT to start to perform upgrading and resetting, so that the ONT and the OLT can basically concurrently or synchronously perform upgrading and resetting, that is, a concurrent upgrade, and a quantity and a time of service interruptions caused when the ONT and the OLT are upgraded are reduced, thereby improving user experience. In addition, after the ONT determines that the ONT locally has a preloaded ONT upgrade program, the ONT may further trigger upgrading and resetting of the ONT to ensure accuracy of triggering upgrading, so that an upgrade failure caused by mis-determining of triggering upgrading can be avoided.

Figure 6:
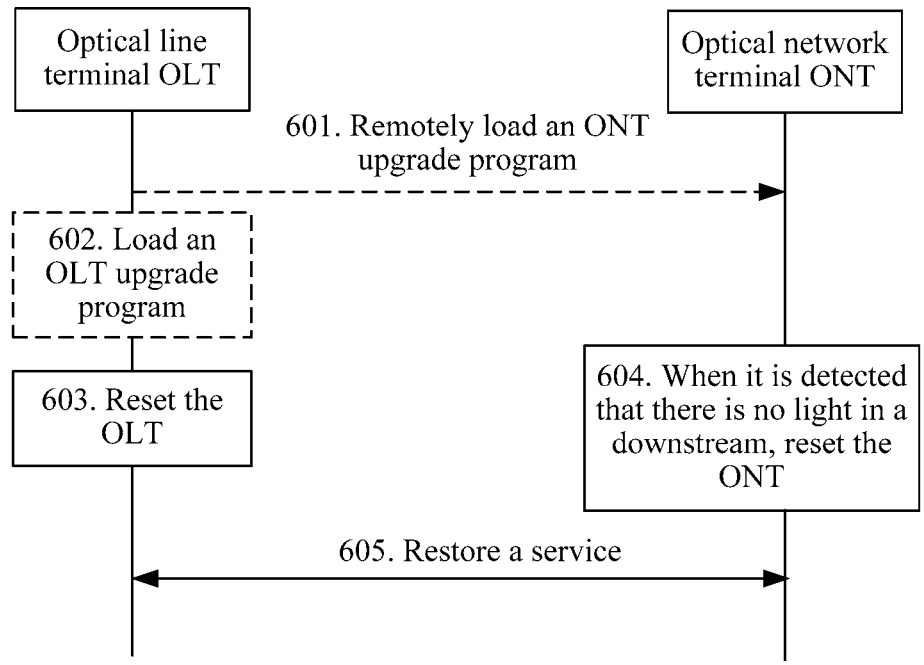
FIG. 6 is an interaction diagram of a system upgrade method according to another embodiment of the present invention.

FIG. 6 is an interaction diagram of a system upgrade method according to another embodiment of the present invention.

601. Remotely load an ONT upgrade program.

Before a system upgrade is performed, an upgrade program needs to be preloaded to each to-be-upgraded device. Because upgrading of a PON system is generally controlled and dominated by a central office, an upgrade program of an ONT at a user's premises is generally delivered by an OLT and loaded to a corresponding ONT device for use in subsequent upgrading of the ONT device.

It should be understood that step 601 is an optional step. Specifically, in addition to that the ONT upgrade program is remotely loaded, in some special cases, the ONT upgrade program may be directly loaded to the ONT. In this process, network maintenance personnel may manually load the ONT upgrade program at the user's premises, or the ONT device locally prestores the ONT upgrade program, which is not limited in the present invention.

It should further be understood that step 601 is not necessarily performed before step 602. Step 601 may be performed at any moment before the following step 604: After the ONT detects that there is no downstream light, the ONT performs upgrading and resetting, which is not limited in the present invention.

In addition, in an optional solution, a new program used for upgrading is carried in the ONT upgrade program, and a concurrent upgrade command may further be added, so that when the ONT detects an upgrade triggering event, the ONT performs upgrading and resetting. Specifically, in an example, a 128-byte command area may be added to a tail of a normal upgrade program, where 2 bytes may be used to indicate a command type, that is, a concurrent upgrade, 2 bytes may be used to indicate a command length, and remaining 124 bytes may indicate command content. The command content may specifically indicate that if the ONT detects a loss of a downstream optical signal (there is no light in a downstream) from the OLT, the ONT starts to perform upgrading and resetting to activate a preloaded ONT upgrade program.

In addition, in a preferable embodiment, the command may further be set to that the ONT triggers upgrading and resetting of the ONT only if the ONT detects that a time during which there is no light in the downstream exceeds a predetermined time period. Herein, the predetermined time period may be preset to 100 ms, so as to avoid mis-determining caused by a transient interruption of downstream light. The predetermined time period may be determined by the network maintenance personnel according to experience or an experimental result to make the predetermined time period greater than a general time of the transient interruption of downstream light.

In addition, the command may further be set to that when detecting that there is no light in the downstream, the ONT further needs to determine that the ONT locally has the preloaded ONT upgrade program. The ONT triggers upgrading and resetting of the ONT only when both the foregoing conditions are met, so that accuracy of triggering upgrading can be ensured, so as to avoid an upgrade failure caused by mis-determining of triggering upgrading.

602. Load an OLT upgrade program.

Before step 603: Reset the OLT, an upgrade program also needs to be loaded to the OLT, which is similar to step 601, where the OLT upgrade program may be loaded under the control of the central office or manually loaded by the network maintenance personnel, which is not limited in the present invention. In addition, step 602 may be performed at any moment before step 603.

603. Reset the OLT.

After receiving an upgrade command, the OLT performs upgrading and resetting of the OLT to activate a preloaded OLT upgrade program, so that the OLT upgrade program becomes effective. Specifically, the upgrade command may be sent by an upper-layer control network element of the OLT or may be manually sent by the network maintenance personnel. Alternatively, the OLT may automatically initiate upgrading and resetting, where a condition of automatically initiating upgrading and resetting by the OLT may be agreed as that the OLT completes loading the upgrade program and sends, to the ONT, an indication message that is used to indicate the upgrade triggering event.

Upgrading and resetting of the OLT are restarting a hardware device to drive resetting of a software system. When the device is restarted, downstream OLT light emission is closed, and therefore a service is interrupted.

604. After detecting that there is no light in the downstream, the ONT performs upgrading and resetting.

When the ONT detects an interruption of the downstream optical signal from the OLT, that is, there is no light in the downstream, the ONT triggers upgrading and resetting of the ONT. Specifically, when the ONT upgrade program in the foregoing step 601 is a normal upgrade program, that is, does not include an additionally added concurrent upgrade command, the ONT needs to support a function of automatically detecting that there is no light in the downstream and then performing upgrading and resetting. Specifically, this function may be supported by a software version of the ONT, or locally preconfigured on the ONT.

When the ONT upgrade program in the foregoing step 601 includes the concurrent upgrade command, the ONT triggers, according to the command, upgrading and resetting of the ONT when the interruption of the downstream optical signal from the OLT is detected, that is, there is no light in the downstream. If the command further includes another condition, for example, the predetermined time period is 100 ms, and it is determined that the ONT locally has the preloaded ONT upgrade program, the ONT needs to determine that the foregoing conditions are met, and then can trigger upgrading and resetting of the ONT to activate the preloaded ONT upgrade program, so that the upgrade program becomes effective.

605. Restore the service.

After upgrading and resetting end, the ONT may continue detecting the downstream optical signal from the OLT, so as to determine whether the OLT completes upgrading; and if no downstream optical signal is detected, may keep detecting; or if a downstream optical signal is detected, notifies the OLT that upgrading of the ONT succeeds. The OLT responds to the ONT, and then normal service communication is performed, so that the service between the OLT and the ONT is restored.

It should be understood that it is assumed that a moment of starting upgrading and resetting of the OLT is t1, a moment of ending upgrading and resetting of the OLT is t2, a moment of starting upgrading and resetting of the ONT is t3, and a moment of ending upgrading and resetting of the ONT is t6. It may be considered that t1 and t3 are basically a same moment or t3 is later than t1, where an amount of lateness is the predetermined time period in the foregoing step 603, for example, 100 ms. A moment of ending upgrading and resetting depends on times that are consumed during upgrading and resetting of the OLT and the ONT. A time difference T between t1 and a later moment of t2 and t6 is a time of a service interruption in this embodiment of the present invention. It is easy to understand that T is less than a sum of the times that are consumed during upgrading and resetting of the OLT and the ONT.

According to this embodiment of the present invention, an OLT and an ONT agree on an upgrade triggering event, so that the ONT and the OLT can basically concurrently or synchronously perform upgrading and resetting, that is, a concurrent upgrade, and a quantity and a time of service interruptions caused when the ONT and the OLT are upgraded are reduced, thereby improving user experience. In addition, detecting a loss of a downstream optical signal within a predetermined time period may further be agreed on and preset in the upgrade triggering event, so as to avoid mis-determining caused by a transient interruption of downstream light and avoid an upgrade failure caused by the mis-determining.

Figure 7:
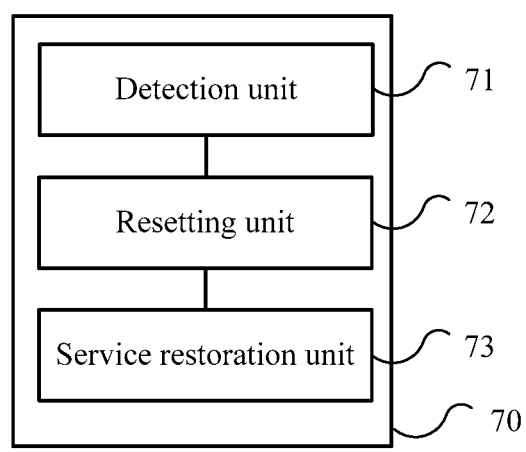
FIG. 7 is a schematic block diagram of an optical network terminal according to an embodiment of the present invention.

FIG. 7 is a schematic block diagram of an optical network terminal according to an embodiment of the present invention. The optical network terminal ONT 70 shown in FIG. 7 includes a detection unit 71, a resetting unit 72, and a service restoration unit 73.

The detection unit 71 detects an upgrade triggering event, where the upgrade triggering event is used to instruct the optical network terminal ONT 70 and an optical line terminal OLT to perform a concurrent upgrade. The resetting unit 72 resets the ONT 70 to activate a preloaded ONT upgrade program. The service restoration unit 73 restores a service with the OLT.

According to this embodiment of the present invention, an ONT 70 and an OLT perform a concurrent upgrade, so that a quantity and a time of service interruptions caused when the ONT 70 and the OLT are upgraded are reduced, thereby improving user experience.

The concurrent upgrade means that when a device or functional entity is upgraded, another associated device or functional entity is also upgraded accordingly. For example, that the ONT and the OLT perform the concurrent upgrade means that when the OLT is upgraded, the ONT is upgraded concurrently or synchronously with the OLT. A case in which the ONT and the OLT are upgraded and reset concurrently or synchronously is relative to a case in which the ONT and the OLT are upgraded and reset separately and independently. In other words, when there is an intersection between time periods in which the ONT and the OLT are upgraded and reset, it may be considered that the ONT and the OLT are upgraded and reset concurrently or synchronously.

When the ONT 70 detects an upgrade triggering event that meets a condition, the ONT 70 triggers upgrading and resetting of the ONT 70. When the ONT 70 detects the upgrade triggering event, it indicates that the OLT is also to start or starts to perform upgrading and resetting of the OLT. In this case, upgrading and resetting of the ONT 70 and upgrading and resetting of the OLT constitute the concurrent upgrade. After completing upgrading, the OLT may restore the service with the ONT 70 that also completes upgrading, so that a user can perform normal communication.

Optionally, in an embodiment, the upgrade triggering event includes at least one of the following: no downstream optical signal from the OLT is detected within a predetermined time period; a concurrent upgrade message that instructs the ONT to perform resetting and is sent by the OLT before the OLT is upgraded and reset is received; or the preloaded ONT upgrade program is detected.

That is, when the ONT detects any one or more of the foregoing cases, the ONT may trigger upgrading and resetting. Specifically, the OLT at normal work continuously sends a downstream optical signal, that is, light is continuously emitted in a downstream, and when the OLT performs upgrading and resetting, an interruption of downstream light emission may be caused due to device restart. In this case, the ONT may detect a loss of the downstream optical signal (Loss of Signal, LOS), and upgrading and resetting subsequently performed by the ONT are basically concurrent or synchronous with upgrading and resetting of the OLT.

Preferably, a downstream LOS time period may be preset, that is, the ONT triggers upgrading and resetting of the ONT only when the ONT detects that a downstream LOS time exceeds the time period. In this way, mis-determining of the ONT caused by a short-time transient interruption of the downstream optical signal from the OLT may be avoided.

Optionally, the upgrade triggering event may be: the ONT detects the concurrent upgrade message delivered by the OLT, where the concurrent upgrade message is used to instruct the ONT to immediately perform upgrading and resetting. The concurrent upgrade message may be sent to the ONT when the OLT is to perform upgrading and resetting of the OLT or starts to perform upgrading and resetting, so as to ensure that the ONT and the OLT basically concurrently or synchronously start to perform upgrading and resetting.

In addition, that the preloaded ONT upgrade program is detected may be used as an additional triggering condition. That the preloaded ONT upgrade program is detected, and that the downstream LOS is detected or that the concurrent upgrade message is received are combined as a condition for determining whether the ONT triggers upgrading and resetting. In this way, accuracy of triggering upgrading and resetting of the ONT can be further ensured, so as to avoid an upgrade failure.

Optionally, in an embodiment, the ONT 70 further includes a receiving unit, where the receiving unit is configured to receive an indication message that is used to indicate the upgrade triggering event to the ONT 70 and sent by the OLT. That is, the OLT and the ONT may agree on the upgrade triggering event in advance, so that when the ONT detects the upgrade triggering event that is agreed on in advance, the ONT performs upgrading and resetting.

Optionally, the indication message includes at least one of the following: an OAM, an OMCI, and a PLOAM. Specifically, an attribute or information that is used to indicate the upgrade triggering event may be added into a specific message that is used to manage the ONT, so as to form the foregoing indication message.

Optionally, in an embodiment, the ONT 70 further includes a receiving unit, where the receiving unit is configured to receive and load the ONT upgrade program sent by the OLT.

Generally, the ONT upgrade program is delivered by the OLT and loaded to a corresponding ONT device for use in subsequent upgrading of the ONT device. In addition, alternatively, network maintenance personnel may manually load the ONT upgrade program to the ONT, or the ONT device locally prestores the ONT upgrade program.

Optionally, in an embodiment, the ONT upgrade program includes: a command line that is used to indicate the upgrade triggering event to the ONT. That is, a new program used for upgrading is carried in the ONT upgrade program, and a concurrent upgrade command may further be added, so that when the ONT detects the upgrade triggering event, the ONT performs upgrading and resetting.

Optionally, in an embodiment, the service restoration unit 73 is specifically configured to restore the service in a case in which after upgrading and resetting end, the ONT detects the downstream optical signal from the OLT by using the detection unit 71, and if the downstream optical signal is detected, notifies the OLT that upgrading of ONT succeeds; and the OLT responds to the ONT, and then normal service communication is performed.

According to this embodiment of the present invention, an ONT 70 and an OLT basically concurrently or synchronously perform upgrading and resetting, that is, a concurrent upgrade, so that a quantity and a time of service interruptions caused when the ONT 70 and the OLT are upgraded are reduced, thereby improving user experience. In addition, detecting a loss of a downstream optical signal within a predetermined time period may further be agreed on and preset in an upgrade triggering event, so as to avoid mis-determining caused by a transient interruption of downstream light and avoid an upgrade failure caused by the mis-determining.

Figure 8:
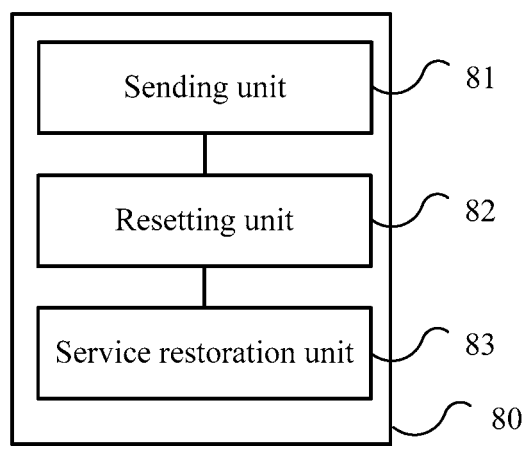
FIG. 8 is a schematic block diagram of an optical line terminal according to an embodiment of the present invention.

FIG. 8 is a schematic block diagram of an optical line terminal according to an embodiment of the present invention. The optical line terminal OLT 80 shown in FIG. 8 includes a sending unit 81, a resetting unit 82, and a service restoration unit 83.

The sending unit 81 sends an indication message to an optical network terminal ONT, where the indication message is used to instruct the ONT and the optical line terminal OLT to perform a concurrent upgrade. The resetting unit 82 resets the OLT to activate a preloaded OLT upgrade program. The service restoration unit 83 restores a service with the ONT.

According to this embodiment of the present invention, an ONT and an OLT 80 perform a concurrent upgrade, so that a quantity and a time of service interruptions caused when the ONT and the OLT 80 are upgraded are reduced, thereby improving user experience.

The concurrent upgrade means that when a device or functional entity is upgraded, another associated device or functional entity is also upgraded accordingly. For example, that the ONT and the OLT perform the concurrent upgrade means that when the OLT is upgraded, the ONT is upgraded concurrently or synchronously with the OLT. A case in which the ONT and the OLT are upgraded and reset concurrently or synchronously is relative to a case in which the ONT and the OLT are upgraded and reset separately and independently. In other words, when there is an intersection between time periods in which the ONT and the OLT are upgraded and reset, it may be considered that the ONT and the OLT are upgraded and reset concurrently or synchronously.

The OLT 80 sends the indication information to the ONT and instructs the ONT to perform upgrading and resetting when a particular condition is met or to immediately perform upgrading and resetting. When the ONT meets the particular condition, it indicates that the OLT 80 is to start or starts to perform upgrading and resetting. If the OLT 80 instructs the ONT to immediately perform upgrading and resetting, it also indicates that the OLT 80 is to start or starts to perform upgrading and resetting. Therefore, upgrading and resetting of the ONT and upgrading and resetting of the OLT 80 constitute the concurrent upgrade. After completing upgrading, the OLT 80 may restore the service with the ONT that also completes upgrading, so that a user can perform normal communication.

Optionally, in an embodiment, the indication message is used to indicate attribute information that the ONT performs ONT resetting when the ONT detects no downstream optical signal from the OLT 80 within a predetermined time period, or to instruct the ONT to perform resetting.

That is, when the ONT detects any one or more of the foregoing cases, the ONT may trigger upgrading and resetting. Specifically, the OLT 80 at normal work continuously sends a downstream optical signal, that is, light is continuously emitted in a downstream, and when the OLT 80 performs upgrading and resetting, an interruption of downstream light emission may be caused due to device restart. In this case, the ONT may detect a loss of the downstream optical signal (Loss of Signal, LOS), and upgrading and resetting subsequently performed by the ONT are basically concurrent or synchronous with upgrading and resetting of the OLT.

Preferably, a downstream LOS time period may be preset, that is, the ONT triggers upgrading and resetting of the ONT only when the ONT detects that a downstream LOS time exceeds the time period. In this way, mis-determining of the ONT caused by a short-time transient interruption of the downstream optical signal from the OLT 80 may be avoided.

Optionally, an upgrade triggering event may be: the ONT detects a concurrent upgrade message delivered by the OLT 80, where the concurrent upgrade message is used to instruct the ONT to immediately perform upgrading and resetting. The concurrent upgrade message may be sent to the ONT when the OLT 80 is to perform upgrading and resetting of the OLT 80 or starts to perform upgrading and resetting, so as to ensure that the ONT and the OLT 80 basically concurrently or synchronously start to perform upgrading and resetting.

In addition, that a preloaded ONT upgrade program is detected may be used as an additional triggering condition. That the preloaded ONT upgrade program is detected, and that the downstream LOS is detected or that the concurrent upgrade message is received are combined as a condition for determining whether the ONT triggers upgrading and resetting. In this way, accuracy of triggering upgrading and resetting of the ONT can be further ensured, so as to avoid an upgrade failure.

Optionally, in an embodiment, the sending unit 81 is further configured to send the ONT upgrade program to the ONT, so that the ONT loads the ONT upgrade program. Generally, the ONT upgrade program is delivered by the OLT 80 and loaded to a corresponding ONT device for use in subsequent upgrading of the ONT device. In addition, alternatively, network maintenance personnel may manually load the ONT upgrade program to the ONT, or the ONT device locally prestores the ONT upgrade program.

Optionally, in an embodiment, the ONT upgrade program includes: a command line that is used to indicate that the ONT performs ONT resetting when the ONT detects no downstream optical signal from the OLT 80 within the predetermined time period. That is, a new program used for upgrading is carried in the ONT upgrade program, and a concurrent upgrade command may further be added, so that when the ONT detects the loss of the downstream optical signal, the ONT performs upgrading and resetting.

Optionally, in an embodiment, the indication message includes at least one of the following: an OAM, an OMCI, and a PLOAM. Specifically, an attribute or information that is used to instruct or trigger the ONT to perform upgrading and resetting may be added into a specific message that is used to manage the ONT, so as to form the foregoing indication message.

Optionally, in an embodiment, the predetermined time period is greater than 100 ms. In this way, mis-determining caused by a transient interruption of downstream light may be avoided. The predetermined time period may be determined by the network maintenance personnel according to experience or an experimental result to make the predetermined time period greater than a general time of the transient interruption of downstream light.

Optionally, in an embodiment, after upgrading and resetting end, the ONT detects the downstream optical signal from the OLT 80; and if the downstream optical signal is detected, notifies the OLT 80 that upgrading of the ONT succeeds. The OLT 80 responds to the ONT, and then normal service communication is performed, so that the service is restored.

According to this embodiment of the present invention, an ONT and an OLT 80 basically concurrently or synchronously perform upgrading and resetting, that is, a concurrent upgrade, so that a quantity and a time of service interruptions caused when the ONT and the OLT 80 are upgraded are reduced, thereby improving user experience. In addition, detecting a loss of a downstream optical signal within a predetermined time period may further be agreed on and preset in an upgrade triggering event, so as to avoid mis-determining caused by a transient interruption of downstream light and avoid an upgrade failure caused by the mis-determining.

Figure 9:
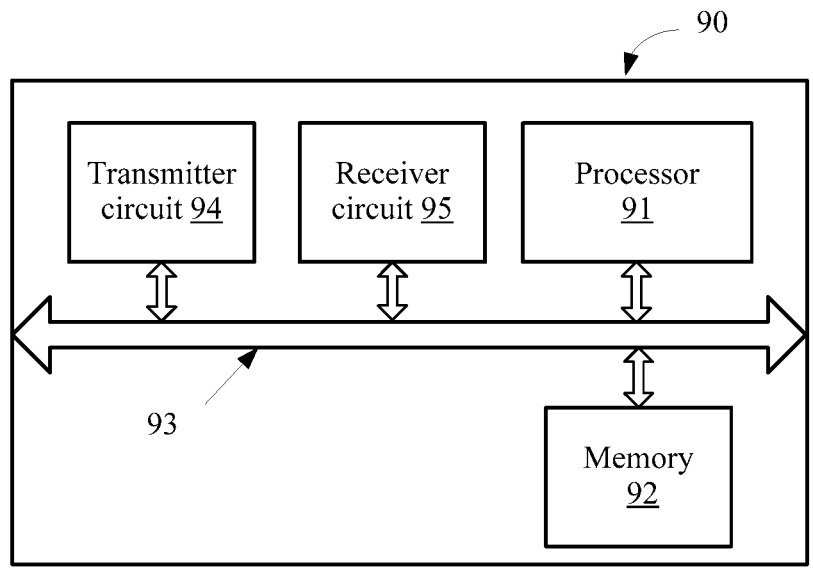
FIG. 9 is a schematic block diagram of an optical network terminal according to another embodiment of the present invention.

FIG. 9 is a schematic block diagram of an optical network terminal according to another embodiment of the present invention. The optical network terminal ONT 90 shown in FIG. 9 includes a processor 91 and a memory 92. The processor 91 and the memory 92 are connected by using a bus system 93.

The memory 92 is configured to store an instruction that enables the processor 91 to perform the following operations: detecting an upgrade triggering event, where the upgrade triggering event is used to instruct the optical network terminal ONT 90 and an optical line terminal OLT to perform a concurrent upgrade; resetting the ONT 90 to activate a preloaded ONT upgrade program; and restoring a service with the OLT.

According to this embodiment of the present invention, an ONT 90 and an OLT perform a concurrent upgrade, so that a quantity and a time of service interruptions caused when the ONT 90 and the OLT are upgraded are reduced, thereby improving user experience.

The concurrent upgrade means that when a device or functional entity is upgraded, another associated device or functional entity is also upgraded accordingly. For example, that the ONT and the OLT perform the concurrent upgrade means that when the OLT is upgraded, the ONT is upgraded concurrently or synchronously with the OLT. A case in which the ONT and the OLT are upgraded and reset concurrently or synchronously is relative to a case in which the ONT and the OLT are upgraded and reset separately and independently. In other words, when there is an intersection between time periods in which the ONT and the OLT are upgraded and reset, it may be considered that the ONT and the OLT are upgraded and reset concurrently or synchronously.

When the ONT 90 detects an upgrade triggering event that meets a condition, the ONT 90 triggers upgrading and resetting of the ONT 90. When the ONT 90 detects the upgrade triggering event, it indicates that the OLT is also to start or starts to perform upgrading and resetting of the OLT. In this case, upgrading and resetting of the ONT 90 and upgrading and resetting of the OLT constitute the concurrent upgrade. After completing upgrading, the OLT may restore the service with the ONT 90 that also completes upgrading, so that a user can perform normal communication.

In addition, the ONT 90 may further include a transmitter circuit 94, a receiver circuit 95, and the like. The processor 91 controls an operation of the ONT 90, and the processor 91 may also be referred to as a CPU (Central Processing Unit, central processing unit). The memory 92 may include a read-only memory and a random access memory and provides an instruction and data for the processor 91. A part of the memory 92 may further include a nonvolatile random access memory (NVRAM). Components of the ONT 90 are coupled together by using the bus system 93. In addition to a data bus, the bus system 93 may further include a power supply bus, a control bus, a status signal bus, and the like. However, for clarity of description, buses are marked as the bus system 93 in the figure.

The method disclosed in the foregoing embodiment of the present invention may be applied to the processor 91 or implemented by the processor 91. The processor 91 may be an integrated circuit chip and has a signal processing capability. In an implementation process, the steps in the foregoing method may be completed by using an integrated logic circuit of hardware in the processor 91 or an instruction in a form of software. The foregoing processor may be a general purpose processor, a digital signal processor (DSP), an application-specific integrated circuit (ASIC), a field programmable gate array (FPGA) or another programmable logic component, a discrete gate or a transistor logic component, or a discrete hardware component, which may implement or execute the methods, the steps, and the logical block diagrams disclosed in the embodiments of the present invention. The general purpose processor may be a microprocessor, or the processor may be any conventional processor, or the like. The steps of the method disclosed with reference to this embodiment of the present invention may be directly executed and completed by a hardware decoding processor, or executed and completed by a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 92. The processor 91 reads information from the memory 92 and completes the steps in the foregoing method in combination with hardware of the processor 91.

Optionally, in an embodiment, the upgrade triggering event includes at least one of the following: no downstream optical signal from the OLT is detected within a predetermined time period; a concurrent upgrade message that instructs the ONT to perform resetting and is sent by the OLT before the OLT is upgraded and reset is received; or the preloaded ONT upgrade program is detected.

Optionally, in an embodiment, the receiver circuit 95 is configured to receive an indication message that is used to indicate the upgrade triggering event to the ONT and sent by the OLT.

Optionally, in an embodiment, the indication message includes at least one of the following: an OAM, an OMCI, and a PLOAM.

Optionally, in an embodiment, the receiver circuit 95 is configured to receive and load the ONT upgrade program sent by the OLT.

Optionally, in an embodiment, the ONT upgrade program includes: a command line that is used to indicate the upgrade triggering event to the ONT.

Optionally, in an embodiment, the concurrent upgrade message includes at least one of the following: an OMCI and a broadcast PLOAM.

Optionally, in an embodiment, the predetermined time period is greater than 100 ms.

According to this embodiment of the present invention, an ONT 90 and an OLT basically concurrently or synchronously perform upgrading and resetting, that is, a concurrent upgrade, so that a quantity and a time of service interruptions caused when the ONT 90 and the OLT are upgraded are reduced, thereby improving user experience. In addition, detecting a loss of a downstream optical signal within a predetermined time period may further be agreed on and preset in an upgrade triggering event, so as to avoid mis-determining caused by a transient interruption of downstream light and avoid an upgrade failure caused by the mis-determining.

Figure 10:
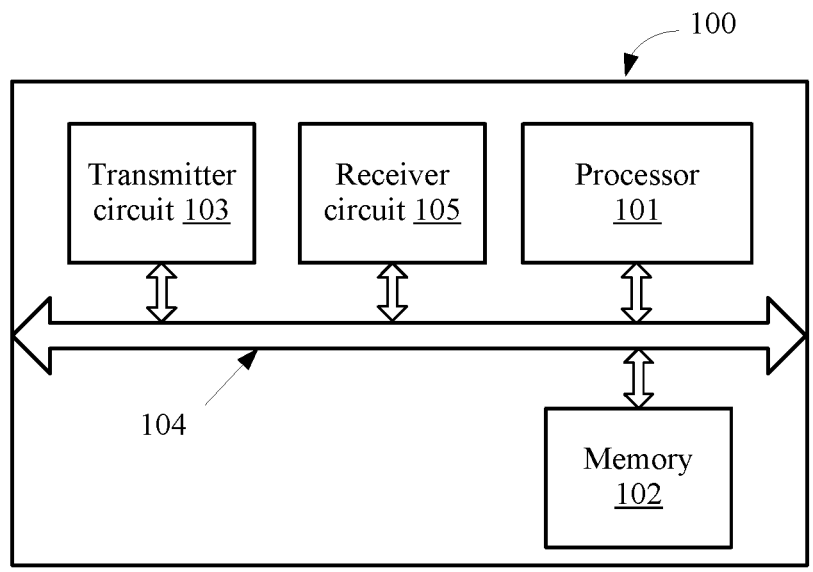
FIG. 10 is a schematic block diagram of an optical line terminal according to another embodiment of the present invention.

FIG. 10 is a schematic block diagram of an optical line terminal according to another embodiment of the present invention. The optical line terminal OLT 100 shown in FIG. 10 includes a processor 101, a memory 102, and a transmitter circuit 103. The processor 101, the memory 102, and the transmitter circuit 103 are connected by using a bus system 104.

The memory 102 is configured to store an instruction that enables the processor 101 to perform the following operations: sending an indication message to an optical network terminal ONT by using the transmitter circuit 103, where the indication message is used to instruct the ONT and the optical line terminal OLT to perform a concurrent upgrade; resetting the OLT to activate a preloaded OLT upgrade program; and restoring a service with the ONT.

According to this embodiment of the present invention, an ONT and an OLT 100 perform a concurrent upgrade, so that a quantity and a time of service interruptions caused when the ONT and the OLT 100 are upgraded are reduced, thereby improving user experience.

The concurrent upgrade means that when a device or functional entity is upgraded, another associated device or functional entity is also upgraded accordingly. For example, that the ONT and the OLT perform the concurrent upgrade means that when the OLT is upgraded, the ONT is upgraded concurrently or synchronously with the OLT. A case in which the ONT and the OLT are upgraded and reset concurrently or synchronously is relative to a case in which the ONT and the OLT are upgraded and reset separately and independently. In other words, when there is an intersection between time periods in which the ONT and the OLT are upgraded and reset, it may be considered that the ONT and the OLT are upgraded and reset concurrently or synchronously.

The OLT 100 sends the indication information to the ONT and instructs the ONT to perform upgrading and resetting when a particular condition is met or to immediately perform upgrading and resetting. When the ONT meets the particular condition, it indicates that the OLT 100 is to start or starts to perform upgrading and resetting. If the OLT 100 instructs the ONT to immediately perform upgrading and resetting, it also indicates that the OLT 100 is to start or starts to perform upgrading and resetting. Therefore, upgrading and resetting of the ONT and upgrading and resetting of the OLT 100 constitute the concurrent upgrade. After completing upgrading, the OLT 100 may restore the service with the ONT that also completes upgrading, so that a user can perform normal communication.

In addition, the OLT 100 may further include a receiver circuit 105 and the like. The processor 101 controls an operation of the OLT 100, and the processor 101 may also be referred to as a CPU (Central Processing Unit, central processing unit). The memory 102 may include a read-only memory and a random access memory and provides an instruction and data for the processor 101. A part of the memory 102 may further include a nonvolatile random access memory (NVRAM). Components of the OLT 100 are coupled together by using the bus system 104. In addition to a data bus, the bus system 104 may further include a power supply bus, a control bus, a status signal bus, and the like. However, for clarity of description, buses are marked as the bus system 104 in the figure.

The method disclosed in the foregoing embodiment of the present invention may be applied to the processor 101 or implemented by the processor 101. The processor 101 may be an integrated circuit chip and has a signal processing capability. In an implementation process, the steps in the foregoing method may be completed by using an integrated logic circuit of hardware in the processor 101 or an instruction in a form of software. The foregoing processor 101 may be a general purpose processor, a digital signal processor (DSP), an application-specific integrated circuit (ASIC), a field programmable gate array (FPGA) or another programmable logic component, a discrete gate or a transistor logic component, or a discrete hardware component, which may implement or execute the methods, the steps, and the logical block diagrams disclosed in the embodiments of the present invention. The general purpose processor may be a microprocessor, or the processor may be any conventional processor, or the like. The steps of the method disclosed with reference to this embodiment of the present invention may be directly executed and completed by a hardware decoding processor, or executed and completed by a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 102. The processor 101 reads information from the memory 102 and completes the steps in the foregoing method in combination with hardware of the processor 101.

Optionally, in an embodiment, the indication message sent by the transmitter circuit 103 is used to indicate attribute information that the ONT performs ONT resetting when the ONT detects no downstream optical signal from the OLT within a predetermined time period, or to instruct the ONT to perform resetting.

Optionally, in an embodiment, the transmitter circuit 103 is further configured to send an ONT upgrade program to the ONT, so that the ONT loads the ONT upgrade program.

Optionally, in an embodiment, the ONT upgrade program includes: a command line that is used to indicate that the ONT performs ONT resetting when the ONT detects no downstream optical signal from the OLT within the predetermined time period.

Optionally, in an embodiment, the indication message includes at least one of the following: an OAM, an OMCI, and a PLOAM.

Optionally, in an embodiment, the predetermined time period is greater than 100 ms.

According to this embodiment of the present invention, an ONT and an OLT 100 basically concurrently or synchronously perform upgrading and resetting, that is, a concurrent upgrade, so that a quantity and a time of service interruptions caused when the ONT and the OLT 100 are upgraded are reduced, thereby improving user experience. In addition, detecting a loss of a downstream optical signal within a predetermined time period may further be agreed on and preset in an upgrade triggering event, so as to avoid mis-determining caused by a transient interruption of downstream light and avoid an upgrade failure caused by the mis-determining.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system upgrade method, comprising:
   detecting, by an optical network terminal (ONT), an upgrade triggering event, wherein the upgrade triggering event triggers the ONT to perform a concurrent upgrade with an optical line terminal (OLT);
   performing, by the ONT, a reset to activate a preloaded ONT upgrade program; and
   restoring, by the ONT, a service with the OLT.

2. The method according to claim 1, wherein the upgrade triggering event comprises at least one of the following:
   no downstream optical signal from the OLT being detected within a predetermined time period;
   a concurrent upgrade message instructing the ONT to perform the reset being received from the OLT before the OLT is upgraded and reset; or
   the preloaded ONT upgrade program being detected.

3. The method according to claim 2, wherein before detecting the upgrade triggering event, the method further comprises:
   receiving, by the ONT, an indication message from the OLT indicating the upgrade triggering event.

4. The method according to claim 2, wherein the ONT upgrade program comprises a command line used to indicate the upgrade triggering event to the ONT.

5. The method according to claim 1, wherein before performing the reset, the method further comprises:
   receiving and loading the ONT upgrade program from the OLT.

6. A system upgrade method, comprising:
   sending, by an optical line terminal (OLT), an indication message to an optical network terminal (ONT), wherein the indication message is used to instruct the ONT to perform a concurrent upgrade with the OLT;
   performing, by the OLT, a reset to activate a preloaded OLT upgrade program; and
   restoring, by the OLT, a service with the ONT.

7. The method according to claim 6, wherein the indication message is used to:
   indicate ONT resetting when the ONT detects no downstream optical signal from the OLT within a predetermined time period, or
   instruct the ONT to perform resetting.

8. The method according to claim 6, wherein before performing the reset, the method further comprises:
   sending an ONT upgrade program to the ONT for the ONT to load.

9. The method according to claim 8, wherein the ONT upgrade program comprises:
   a command line used to indicate ONT resetting when the ONT detects no downstream optical signal from the OLT within a predetermined time period.

10. An optical network terminal (ONT), comprising:
    a non-transitory computer-readable medium having processor-executable instructions stored thereon for a system upgrade; and
    a processor, configured to execute the processor-executable instructions to facilitate:
       detecting an upgrade triggering event, wherein the upgrade triggering event triggers the ONT to perform a concurrent upgrade with an optical line terminal (OLT);
       performing a reset to activate a preloaded ONT upgrade program; and
       restoring a service with the OLT.

11. The ONT according to claim 10, wherein the upgrade triggering event comprises at least one of the following:
    no downstream optical signal from the OLT being detected within a predetermined time period;
    a concurrent upgrade message instructing the ONT to perform the reset being received from the OLT before the OLT is upgraded and reset; or
    the preloaded ONT upgrade program being detected.

12. The ONT according to claim 11, wherein the processor is further configured to execute the processor-executable instructions to facilitate:
    before detecting the upgrade triggering event, receiving an indication message from the OLT indicating the upgrade triggering event.

13. The ONT according to claim 10, wherein the processor is further configured to execute the processor-executable instructions to facilitate:
    before performing the reset, receiving and loading the ONT upgrade program from the OLT.

14. The ONT according to claim 11, wherein the ONT upgrade program comprises a command line used to indicate the upgrade triggering event to the ONT.

15. An optical line terminal (OLT), comprising:
    a non-transitory computer-readable medium having processor-executable instructions stored thereon for a system upgrade; and
    a processor, configured to execute the processor-executable instructions to facilitate:
       sending an indication message to an optical network terminal (ONT), wherein the indication message is configured to instruct the ONT to perform a concurrent upgrade with the OLT;
       performing a reset to activate a preloaded OLT upgrade program; and
       restoring a service with the ONT.

16. The OLT according to claim 15, wherein the indication message is configured to:
    indicate ONT resetting when the ONT detects no downstream optical signal from the OLT within a predetermined time period, or
    instruct the ONT to perform resetting.

17. The OLT according to claim 15, wherein the processor is further configured to execute the processor-executable instructions to facilitate:
  before performing the reset, sending an ONT upgrade program to the ONT for the ONT to load.

18. The OLT according to claim 17, wherein the ONT upgrade program comprises:
  a command line configured to indicate ONT resetting when the ONT detects no downstream optical signal from the OLT within a predetermined time period.

* * * * *